United States Patent [19]

Hosooka et al.

[11] Patent Number: 4,497,103

[45] Date of Patent: Feb. 5, 1985

[54] METHOD FOR MANUFACTURING A HEAT INSULATION SASH BAR

[75] Inventors: Shuuichi Hosooka; Tetsuji Imai; Haruo Hori, all of Toyama, Japan

[73] Assignee: Yoshida Kogyo K.K., Tokyo, Japan

[21] Appl. No.: 376,783

[22] Filed: May 10, 1982

[30] Foreign Application Priority Data

May 22, 1981 [JP] Japan .................................. 56-76721

[51] Int. Cl.[3] .............................................. B23P 17/00

[52] U.S. Cl. ...................................................... 29/418

[58] Field of Search .................. 29/418, 155 R, 527.1; 52/403, 729, 730, 731, 732; 49/DIG. 1

[56] References Cited

U.S. PATENT DOCUMENTS 3,992,769 11/1976 Jackson ................................ 29/418
4,128,934 12/1978 Doring ................................ 29/418
4,185,439 1/1980 Bischlipp et al. ...................... 29/418
4,330,919 5/1982 Bischlipp et al. ...................... 29/418
4,342,144 8/1982 Doguchi .............................. 29/418

*Primary Examiner*—Howard N. Goldberg
*Assistant Examiner*—Steven E. Nichols
*Attorney, Agent, or Firm*—Hill, Van Santen, Steadman & Simpson

[57] ABSTRACT

The invention provides a novel method for manufacturing a heat insulating sash bar for window frame constructed with two oppositely positioned metal-made face members, one facing inside of the room and the other facing outside of the room, connected together only with a connecting member of a heat insulating material and not with any metal-made part to ensure heat insulation between the two face members. According to the method, the heat insulating connecting member is first inserted into the groove-like channel of a metal-made bar material having an approximately H-wise or U-shaped cross section composed of the two face members connected with a connecting part, the heat insulating connecting member is then securely fixed to the face members by caulking, the connecting part with which the face members have been integrally connected is longitudinally at least partly removed over whole length thereof to thermally isolate the face members from each other, and finally the remaining groove-like channel is filled, for example, with a pourable heat insulating material to be cured or solidified in situ.

3 Claims, 11 Drawing Figures

METHOD FOR MANUFACTURING A HEAT INSULATION SASH BAR

BACKGROUND OF THE INVENTION

The present invention relates to a method for manufacturing a heat insulating sash bar for window sash or, more particularly, to a method for manufacturing a heat insulating sash bar of which remarkably improved heat insulation is obtained between the face plates of the sash bar, one facing the inside of the room and the other facing the outside of the room, as connected with two connecting members made of heat insulating materials in such a manner as to form a hollow space surrounded by the face plates and the heat insulating connecting members.

As is well known, many of the modern window sashes are framed with sash bars made of a metal such as aluminum and shaped by extruding in the form of bar materials. When such window sashes are to be used in severe climatic conditions, there may be a problem in the use of an integrally shaped metal-made sash bar in respect of the heat insulation between inside of the room and outside of the room since the conduction of heat through the integrally shaped sash bars is not negligibly small due to the high heat conductivity of aluminum or the like metal of which the sash bar is made.

In this connection, it is desirable that the two oppositely positioned face plates forming the sash bar, one facing inside of the room and the other facing outside of the room, are not integral but isolated thermally from each other with connecting members made of a heat insulating sash bar is manufactured only with great consumption of time and labor in comparison with an integral metal-made sash bar which can be manufactured by a very efficient process of extrusion and the like alone and the dimensional accuracy of such a heat insulating sash bar is sometimes unsatisfactory depending on the skillfulness of the workers.

SUMMARY OF THE INVENTION

It is therefore an object of the present invention to provide a novel and very efficient method for the manufacture of the heat insulating sash bar of the above described type having a hollow space in the cross section thereof.

Another object of the invention is to provide a method capable of giving a high dimensional accuracy to the heat insulating sash bar of the above described type.

The method of the present invention proposed hereinbelow for manufacturing a heat insulating sash bar comprising two oppositely positioned face members of the sash bar, one facing inside of the room and the other facing outside of the room, connected with a connecting member made of a heat insulating material comprises:

inserting a connecting member made of a heat insulating material into the groove-like portion of a metal-made integral bar material having an approximately H-wise or U-shaped cross section as a whole formed by connecting two oppositely positioned face members with a connecting part to form at least one groove-like portion on one side thereof;

securely fixing the connecting member made of a heat insulating material to both of the face members by caulking the face members into the connecting member;

removing longitudinally at least partly the connecting part of the bar material having an approximately H-wise or U-shaped cross section whereby to thermally isolate the face members from each other by not being connected with the metal-made connecting part;

forming a longitudinally extending hollow space and a groove-like channel within the bar material; and filling the thus formed groove-like channel with a heat insulating material.

DETAILED DESCRIPTION OF THE PREFERRED EMBODIMENTS

The method of the present invention is described in detail with reference to the accompanying drawing.

Figure 1A:
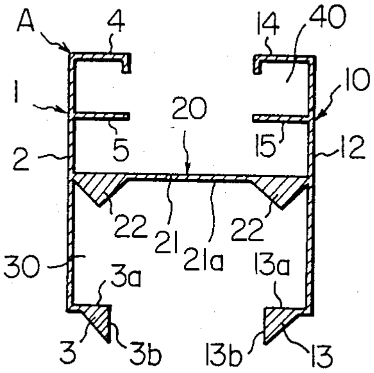
FIGS. 1*a* to 1*e* each illustrate a step of an embodiment of the inventive method by the cross section of the sash bar along the sequential order of the steps.

FIGS. 1*a* to 1*e* give sequential illustration of the steps of a typical embodiment of the inventive method by the cross section of the sash bar. FIG. 1*a* is a cross section of the bar material integrally made of a metal such as aluminum. The cross section of this bar material is, as a whole, approximately H-shaped as composed of two oppositely positioned face members 1, 10 and a connecting part 20 connecting the face members 1, 10 at about the center lines thereof. The connecting part 20 partitions the space between the face plates 2, 12 of the respective face members 1, 10 into two groove-like portions 30, 40. In other words, each of the groove-like channels 30, 40 is formed with the connecting part 20 as the bottom and the face plates 2, 12 of the face members 1, 10 as side walls, respectively.

Each of the face members 1, 10 is provided with the respective face plate 2 or 12 and two inwardly extending flanges 3, 4 or 13, 14 along the peripheries and further provided with a shelf-like intermediate flange 5 or 15. Each of the flanges 3, 13 has a cross section something like a triangle surrounded by the face 3*a* or 13*a* extending perpendicularly to the face plate 2 or 12 and downwardly extending wedge-like face 3*b* or 13*b*.

The connecting part 20 is also provided with two line protrusions 22, 22 on one surface 21*a* along the edges of the plate 21. Each of the line protrusions 22, 22 also has a triangular cross section with a ridgeline facing the flange 3 or 13.

Figure 1B:
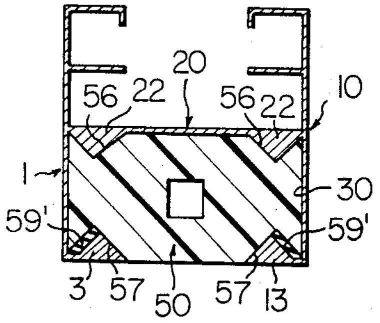
Figure 1C:
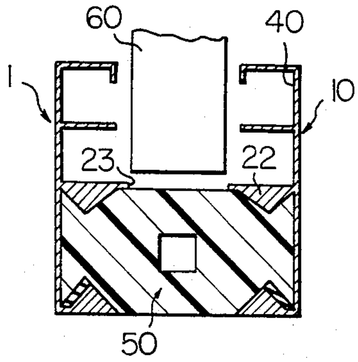
Figure 1D:
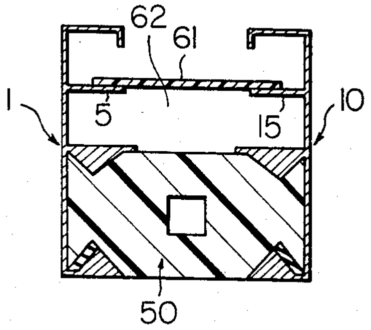

As is shown in FIG. 1*b*, an elongated connecting member 50 made of a heat insulating material is inserted into the first groove-like channel 30 of the H-wise bar material in the longitudinal direction thereof and securely fixed by bending inwardly and caulking the flanges 3, 13 to the face members 1, 10.

Figure 2:
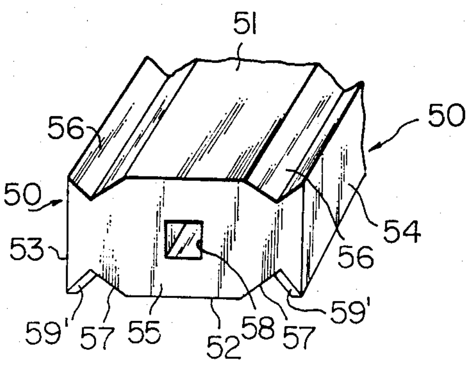
FIG. 2 is a perspective view of the connecting member made of a heat insulating material used in the sash bar illustrated in FIGS. 1*a* to 1*e*.

The connecting member 50 has a configuration as illustrated in FIG. 2 by a perspective view. That is, it is an elongated bar material having the top and bottom surfaces 51, 52, left and right surfaces 53, 54 and end surfaces 55, 55 to give approximately a rectangular cross section as a whole. Two grooves 56, 56 each having a V-shaped cross section are provided on the top surface 51 of the connecting member 50 to fit and be engaged with the triangular line protrusions 22, 22 when the connecting member 50 is inserted into the groove-like channel 30 of the bar material with H-wise cross section. Similarly, two grooves 57, 57 each having a V-shaped cross section are formed on the bottom surface 52 of the connecting member 50 along the peripheries of the bottom surface 52. It is preferable that the connecting member 50 is provided with a through-hole 58 extending in the longitudinal direction. This hollow space 58 in the connecting member 50 contributes to the improvement of heat insulation and to the decrease of the weight of the sash bar.

The connecting member 50 should be highly heat insulating and heat resistant as well as mechanically strong enough to ensure rigidity of the finished sash bar and preferable material for the connecting member 50 is a thermosetting synthetic resin or certain kinds of ceramic materials. It is preferable that at least one of the side surfaces of the V-shaped grooves, for example, 57 is provided with a strip 59' of elastic pad made of a soft flexible synthetic resin or a rubber in order to enhance the caulking effect by bending the flanges 3, 13 into the grooves 57, 57. In this manner, the connecting member 50 is securely fixed to the face members 1, 10 by virtue of the engagement of the line protrusions 22, 22 and the V-shaped grooves 56, 56 and caulking of the flanges 3, 13 into the grooves 57, 57 with resilience of the elastic pad 59', 59'.

In the next place, a cutter 60 thrusted into the second groove-like channel 40 of the H-wise bar material and the central portion of the connecting part 20 is cut off with the cutter 60 and removed to disconnect the face members 1, 10. Thus, the face members 1, 10 are connected together only through the heat insulating connecting member 50 and not by an aluminum part so that the face members 1, 10 are thermally isolated from each other. In this case, the relative position of the face members 1 and 10 is kept unchanged owing to the secured fixing of them to the connecting member 50.

The next step is to put a sheet- or board-like material 61 on and bridging the shelf-like flanges 5, 15 to span over the hollow space 62 formed with the connecting member 50 to below the narrowed groove-like channel 40.

Figure 1E:
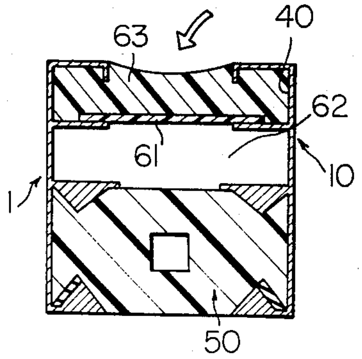

The last step is filling of the thus formed groove-like channel 40 with a heat insulating material 63 as is shown in FIG. 1*e*.

Figure 3A:
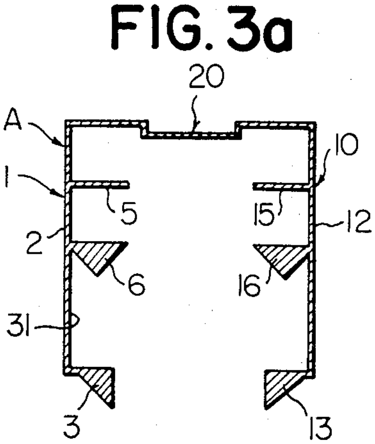
FIGS. 3*a* to 3*d* each illustrate a step of another embodiment of the inventive method by the cross section of the sash bar along the sequential order of the steps.

Another embodiment of the inventive method is illustrated by FIGS. 3*a* to 3*d* in the sequential order of the steps. As is shown in FIG. 3*a*, the bar material integrally shaped by extrusion has a U-shaped cross section as a whole as composed of the two face members 1, 10 connected at each periphery thereof by a connecting part 20 to form a groove-like channel 31 with the connecting part 20 as the bottom and the face members 1, 10 as the side walls. Similarly to the first embodiment illustrated in FIGS. 1*a* to 1*e*, each of the face members 1, 10 is formed of the face plate 2 or 12 provided with a flange 3 or 13 having a triangular cross section at the free periphery and two intermediate flanges 5, 6 or 15, 16, of which the flange 6 or 16 close to the peripheral flange 3 or 13 also has a triangular cross section with a ridgeline facing toward the peripheral flange 3 or 13.

Figure 3B:
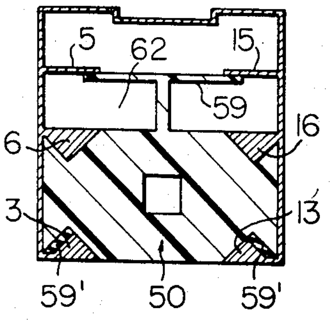
Figure 4:
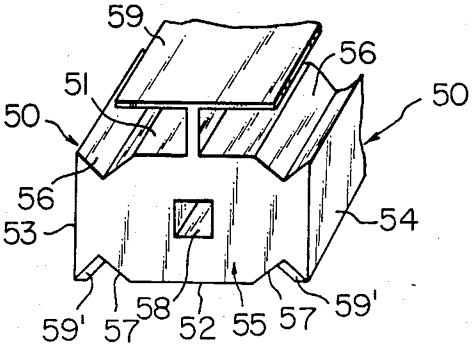
FIG. 4 is a perspective view of the connecting member made of a heat insulating material used in the sash bar illustrated in FIGS. 3*a* to 3*d*.

In this case, the heat insulating connecting member 50 to be inserted into the groove-like portion 31 between the face plates 2 and 12 and between the peripheral and intermediate flanges 3, 13 and 6, 16 has a configuration illustrated in FIG. 4 by a perspective view. General cross sectional configuration is about the same as that of the corresponding member shown in FIG. 2 with the V-shaped grooves 56, 56 and 57, 57 to engage with the triangular intermediate flanges 6, 16 and peripheral triangular flanges 3, 13 caulked thereinto except that a fin-like supporting plate 59 is provided above the top surface 51 of the main body of the member 50. The height of this fin-like supporting plate 59 above the top surface 51 should be such that, when the connecting member 50 is inserted into the groove-like channel 31 of the aluminum-made bar material as is shown in FIG. 3*b*, the upper surface of the fin-like supporting plate 59 is approximately in contact with the lower surfaces of the intermediate shelf-like flanges 5, 15 to form a hollow space 62 surrounded by the top surface 51 of the connecting member 50, face plates 2, 12, shelf-like intermediate flanges 5, 15 and the fin-like supporting plate 59. It is optional that the height of the fin-like supporting plate 59 above the top surface 51 of the body of the connecting member 50 is somewhat larger than above described so that the fin-like supporting plate 59 is in contact with the upper surface of the shelf-like intermediate flanges 5, 15 at the lower surface thereof to form a slightly larger hollow space 62 as well.

At any rate, both of the face members 1, 10 are securely fixed to the connecting member 50 by the engagement of the triangular intermediate flanges 6, 16 with the V-shaped grooves 56, 56 and the triangular peripheral flanges 3, 13 with the V-shaped grooves 57, 57 by caulking thereinto with the aid of the elastic pads 59', 59'.

Figure 3C:
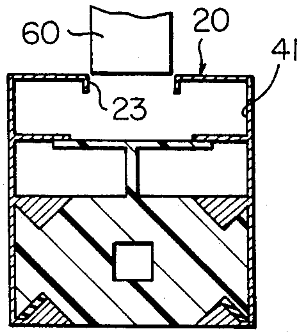

Thereafter, the center portion of the connecting part 20 is cut off with a cutter 60 and removed as is shown in FIG. 3*c* to form a longitudinally extending aperture 23 and a groove-like channel 41 with the supporting plate 59 and the shelf-like intermediate flanges 5, 15 as the bottom and the face plates 2, 12 as the side walls, respectively. In this manner, the face members 1, 10 are thermally isolated from each other as connected with no aluminum-made connecting part but only with the connecting member 50 made of a heat insulating material.

Figure 3D:
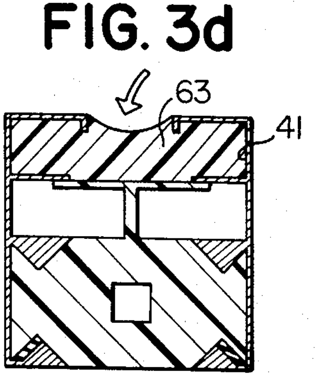

The final step of the method is, as is illustrated in FIG. 3*d*, filling of the groove-like channel 41 with a heat insulating material 63.

The above described second embodiment of the inventive method has advantages in several aspects over the first embodiment illustrated in FIGS. 1*a* to 1*e*. For example, in the first embodiment, the blade of the cutter 60 shown in FIG. 1*c* sometimes reaches the top surface 51 of the connecting member 50 to more or less shave off the material of the connecting member 50 because the top surface 51 of the connecting member 50 is in intimate contact with the lower surface 21 of the connecting part 20 while, in the second embodiment, such misuse of the cutter 60 cannot take place since the connecting part 20 to be cut off with the cutter 60 is positioned apart above the top surface 51 or the fin-like supporting plate 59 of the heat insulating connecting member 50. In addition, the step of putting a sheet-like supporting member 61 on and bridging the shelf-like flanges 5, 15 in the first embodiment can be omitted because the single step of inserting the connecting member 50 into the U-shaped bar material simultaneously serves to form the bottom of the groove-like channel 41 with the fin-like supporting plate 59 brought into contact with the shelf-like intermediate flanges 5, 15 so that the manufacturing process of the heat insulating sash bar is simplified as much.

Instead of cutting off part of the connecting part 20 with a cutter 60 as is described in the above embodiments, it is an alternative way that the connecting part 20 is provided in advance with two parallel incision lines in the longitudinal direction and the portion between the incision lines is removed by merely tearing off without using a cutting tool.

To summarize the above given description for the two embodiments, the present invention provides a novel and efficient method for manufacturing a heat insulating sash bar having a hollow space therein and capable of intercepting the heat conduction between the oppositely positioned face plates, one facing inside of the room and the other facing outside of the room.

In spite of the very much simplified process for manufacturing the sash bar, the product sash bar has a high dimensional accuracy because the two oppositely positioned face members 1, 10, which have been positioned in the starting bar material not always with a high dimensional accuracy, are thermally isolated from each other by removing at least part of the connecting part 20 over whole length thereof only after they are securely fixed by caulking to one and the same connecting member 50 having inherently a high dimensional accuracy inserted into the groove-like channel 30 or 31 therebetween. Furthermore, impregnation of the groove-like channel 40 or 41 with the heat insulating material 63 can be performed after the face members 1, 10 have been securely fixed to the connecting member 50 to finish the product sash bar so that the time for the manufacture of the sash bar is greatly shortened in comparison with the conventional method in which cutting off of the connecting part is performed only after the heat insulating material filling the groove-like channel has been fully solidified taking a considerably long time.

What is claimed is:

1. A method for manufacturing a heat insulating sash bar comprising two oppositely positioned face members of the sash bar, one facing inside of a room and the other facing outside of the room, connecting with a connecting member made of a heat insulating material which comprises the steps of:

inserting the connecting member made of a substantially rigid dimensionally strong heat insulating material into the groove-like channel of a metal-made integral bar material having an approximately H-wise or U-shaped cross section as a whole formed by connecting two oppositely positioned face members with a connecting part to form at least one groove-like channel on one side thereof;

securely fixing the connecting member made of a heat insulating material to both of the face members by deforming projections on the face members into mating depressions in the connecting member;

removing longitudinally at least partly the connecting part of the bar material having an approximately H-wise or U-shaped cross section over whole length thereof whereby to thermally isolate the face members from each other by not being connected with the metal-made connecting part;

forming a longitudinally extending hollow space and a groove-like channel within the bar material; and filling the thus formed groove-like channel with a heat insulating material.

2. The method as claimed in claim 1 wherein the projection on each of the oppositely positioned face members of the bar material has an approximately triangular cross section and the connecting member depression comprises a groove having an approximately V-shaped cross section in such a position that the flange in the face member is engaged with the groove when the connecting member is inserted into the groove-like portion of the bar material and the face member is formed into the connecting member at the flange.

3. The method as claimed in claim 1 wherein the connecting part of the bar material has at least a pair of line projections having an approximately triangular cross section and the connecting member has at least a pair of depressions having an approximately V-shaped cross section in such a position that the line projections in the connecting part are engaged with the depressions in the connecting member when the connecting member is inserted into the groove-like portion of the bar material.

* * * * *